No. 784,063. PATENTED MAR. 7, 1905.
W. A. McGREGOR.
MACHINE FOR BALING COTTON.
APPLICATION FILED OCT. 25, 1902.
2 SHEETS—SHEET 1.
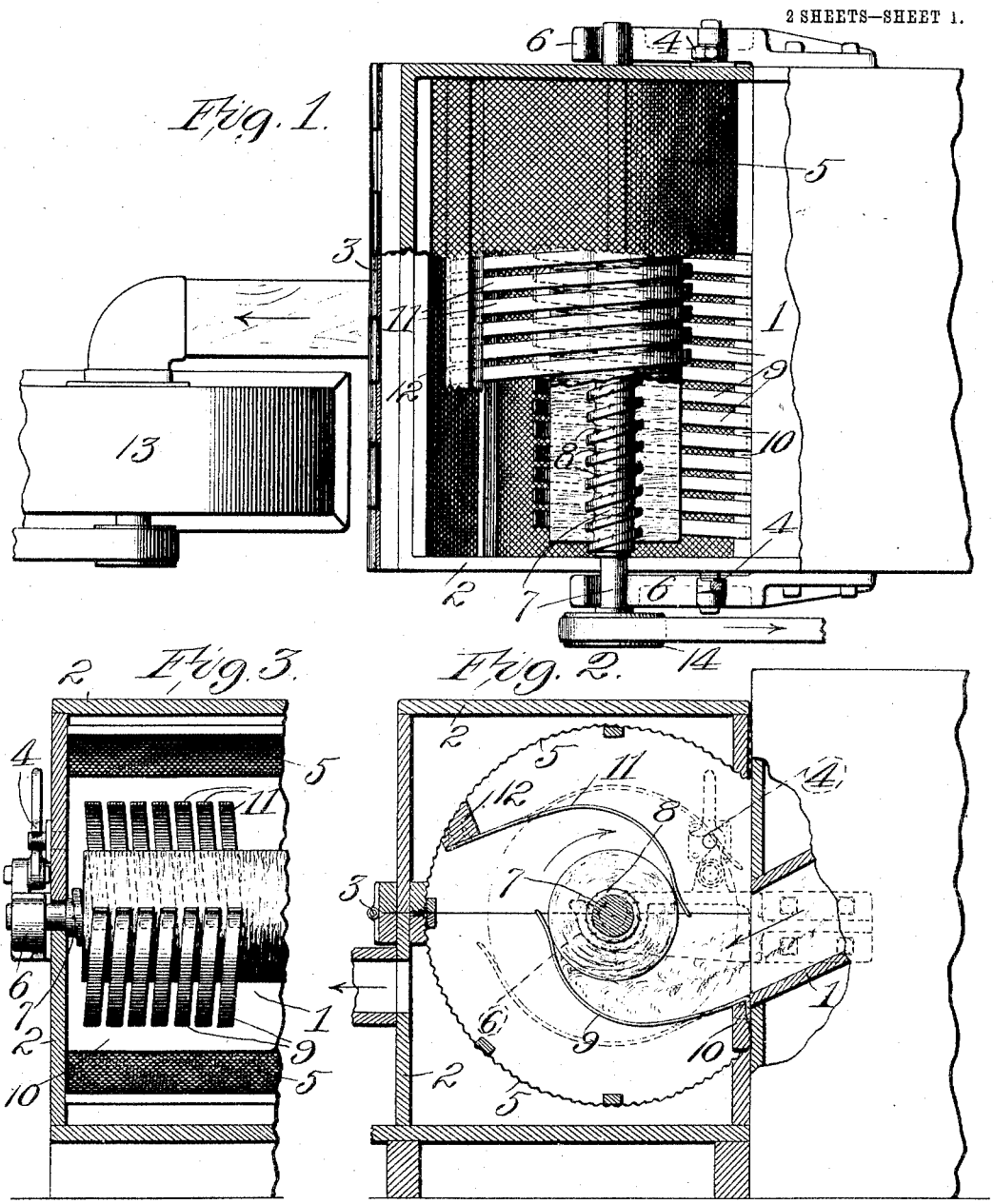
Witnesses:
Inventor:
William A. McGregor,
By Bakewell & Cornwall
attys.

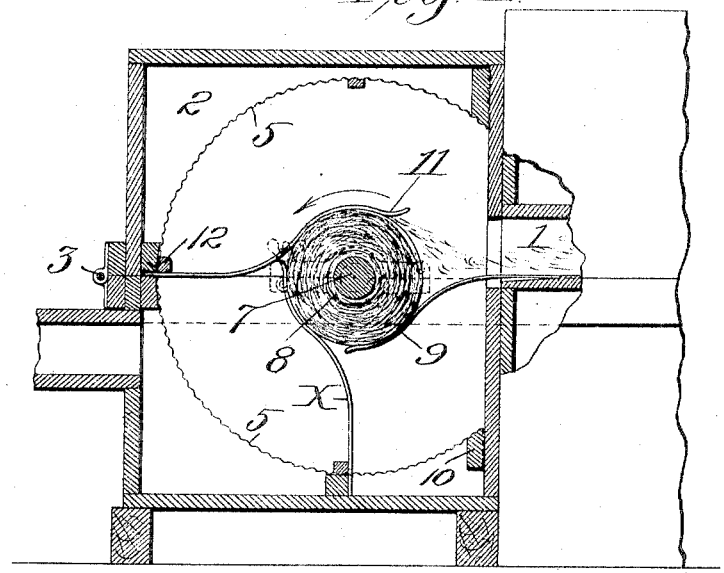
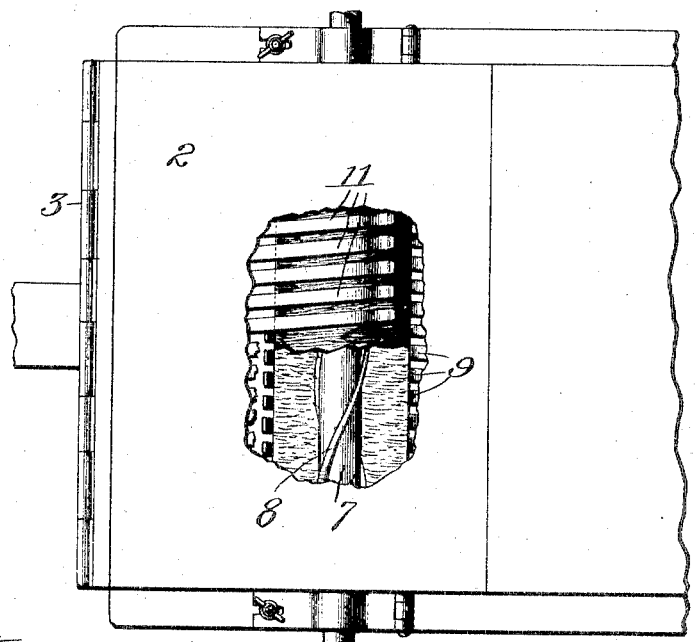

No. 784,063.                                                                     Patented March 7, 1905.

UNITED STATES PATENT OFFICE.

WILLIAM ANDREW McGREGOR, OF NEAME, LOUISIANA, ASSIGNOR OF ONE-HALF TO PAUL BAKEWELL AND FREDERICK R. CORNWALL, OF ST. LOUIS, MISSOURI.

MACHINE FOR BALING COTTON.

SPECIFICATION forming part of Letters Patent No. 784,063, dated March 7, 1905.

Application filed October 25, 1902. Serial No. 128,702.

*To all whom it may concern:*

Be it known that I, WILLIAM ANDREW MC-GREGOR, a citizen of the United States, residing at Neame, Vernon parish, State of Louisiana, have invented a certain new and useful Improvement in Machines for Baling Cotton, of which the following is a full, clear, and exact description, such as will enable others skilled in the art to which it appertains to make and use the same, reference being had to the accompanying drawings, forming part of this specification, in which—

Figure 1 is a top plan view, partly in section, of my improved machine for baling cotton. Fig. 2 is a vertical sectional view through the same. Fig. 3 is a fragmentary longitudinal sectional view. Fig. 4 is a vertical sectional view of another form of my invention, and Fig. 5 is a broken top plan view of Fig. 4.

This invention relates to a new and useful improvement in machines for baling cotton, an object being to take the cotton lint directly from the gin or condenser and wind the same upon a core to form a compact cylindrical bale and at the same time carding the lint-cotton.

Another object is to simplify the construction of machines of this character, so as to enable them to be produced cheaply, and on account of the small amount of power required to operate the machine and its compactness it may be used in gin-houses, and thus enable the production of a round cotton bale at the point where the cotton is ginned.

With these objects in view my invention consists in the novel construction, arrangement, and combination of the several parts, all as will hereinafter be described and afterward pointed out in the claims.

In the drawings, 1 indicates a feed-chute leading from any suitable source of cotton-supply, such as a gin or condenser. This chute discharges the cotton into a closed box-shaped housing 2, which is preferably divided in the middle, the top portion being hinged, as at 3, so that a bale may be removed and an empty core inserted. Hooks or other securing devices 4 are employed to secure the hinged section of the housing in position.

5 indicates a perforated cylinder divided at one side along the line of division of the sectional casing, the opposite side of said cylinder being open to receive the cotton from chute 1.

6 indicates bracket-bearings, in which is mounted a core 7. This core is preferably formed with spurs or projections 8 on its periphery for picking up the lint-cotton in starting a bale. Core 7 may be made of any suitable material and of any cross-section. Depending upon the construction of the core, the same may be left in the bale or said core may be removed from the bale, as when the core is made collapsible or in sections, or by forming a thread on the core said core may be screwed out of the finished bale. In the event that the core is provided with screw-threads the pick-up spurs or projections 8 are preferably formed on the edges of the threads and all extend in one direction—toward the direction of rotation of the core and away from the direction of rotation the core travels in its removal from the bale.

9 indicates springs, which are secured to appropriate supports, said springs being preferably flush with the bottom of the chute 1 and being in the nature of leaf-springs with their free ends bearing upon the core and upon the bale during its process of formation. 11 indicates similar springs mounted upon crossbars 12, said springs having their free ends bearing upon the core and the bale during its process of formation at a point practically opposite the bearing-point of the free ends of springs 9. The bars 12, which form the mount for springs 11, are preferably mounted in the hinged portion of the casing, so that when said hinged portion is thrown back said springs are carried with it to expose the bale and permit its ready removal.

Springs 9 and 11 extend, as shown in Figs. 1, 3, 4, and 5, at opposite angles to the path of rotation of the bale. The purpose of this is to prevent the cotton from packing at one side and to distribute the cotton evenly over the core. It will be observed that in Figs. 1 and 3 the springs bear upon the core only near their ends, while in Figs. 4 and 5 the springs 9 and 11 bear upon said core at points intermediate the length of said springs. With the springs shown in the latter views the least tension is at their free ends, such tension increasing toward the point of attachment of said springs. Thus the lint, whether loose or in bats, passing under the free ends, which are curved outwardly from the core, will be subjected to gradually-increasing pressure, whereby the air will be expelled from the cotton lint and said lint by reason of such gradually-increasing pressure will be pressed firmly upon the core.

13 indicates an exhaust-fan which is connected to the interior of the casing 2 to exhaust air therefrom.

14 indicates a pulley arranged upon one end of the core by which said core is driven.

The operation of the device is as follows: Chute 1 discharges the cotton lint, preferably in its loose fluffy condition, directly into the chamber 2 either by reason of an air-blast acting thereon, a belt conveyer, or any other means which may be found convenient. I prefer that the cotton should be introduced into the baling-chamber in a loose fluffy state, as in that condition it is more readily taken up on account of its fibers lying in various directions. Upon its introduction into the baling-chamber the cotton is received upon one set of springs—in this instance, the springs 9—and accummulates until caught by the spurs 8 on rotating the core. In operation the core is designed to be rotated rapidly—say at a speed of from four to five hundred revolutions per minute—and at this speed when the cotton is caught by the spurs it is carried around the core and pressed inwardly toward the core by the springs 9 and 11. These springs, as before stated, are arranged at opposite angles to each other, and so help to distribute the cotton along the core, in addition to which said springs straighten the fibers or some of them, so that they lie evenly and smoothly on the core—that is to say, the springs exert an action upon the fibers, so that they are arranged in substantial parallelisms as they are wound upon the bale. As a result the finished product has approximately the same appearance as though the fibers were combed or carded, there being few intersecting fibers present. A continued supply of cotton will enable the bale to build itself up by the attachment of additional fibers to the periphery thereof, which are caught during the rotation of the bale and combed and packed thereon by the springs. It will be observed that the springs 9 and 11 have their ends tangentially arranged with relation to the core, so that a smooth action will be exerted upon the bale during the process of forming the same. As the bale increases in size the peripheral speed thereof becomes greater, and consequently the cotton supplied to the bale is not only more evenly distributed than at the beginning of the bale, but, due to the increasing peripheral speed and the increased tension of of said springs owing to the greater distance thereof from said core, the layers are successively packed more tightly, and the bale is thus made more dense and firm toward its periphery. When the bale is of sufficient size, the supply of cotton is shut off temporarily, but the rotation of the bale is kept up for a short time in order to give a finish to the bale by making on its surface a smooth hard coating of cotton fiber sufficiently matted with the next adjacent layer underneath to prevent its removal. When the bale is finished, the top of the casing is thrown back, the bale removed, and a new core inserted, after which the supply of cotton is again admitted to the baling-chamber.

From the above it will be noted that the rapidity of rotation is such that upon its introduction into the baling-chamber the cotton is immediately picked up and packed on the bale, and as the supply is continuous the bale is built up substantially of layers whose fibers are combed by the springs and packed with gradually-increasing pressure as the cotton passes under said springs. At the same time they become attached to the bale, so that air is excluded from the bale. This method all of straightening or arranging the fibers in approximate parallelisms on the bale permits of its being readily handled subsequently, as the cotton can be removed in layers on account of the straightening and packing action of the springs causing most of the fibers to lie substantially parallel. I have shown two sets of springs in Figs. 1 and 2 and three sets of springs in Figs. 4 and 5, which latter springs are indicated by 9, 11, and $x$, which springs are shown as acting upon the bale, and these are sufficient to prevent centrifugal force from throwing off flakes of cotton which are pressed against the bale by the springs; but it is obvious that more sets of springs could be employed, if desired, or separate carding means employed in addition to said springs.

To prevent the cotton floating in the baling-chamber, due to the agitation of the air resulting from the high speed at which the core is rotated, I connect an exhaust-fan to the interior of the casing 2, but preferably outside of the screened cylinder 5. This fan is preferably of sufficient force to produce a partial vacuum in the chamber, and as an air-current will be induced to flow into the baling-chamber through the inlet-chute 1 it is obvious that this incoming current of air assists in feeding the cotton to the core. Upon reaching the springs the cotton is forced onto the core, as the space between the springs is of such size as to prevent the cotton falling down onto the screen.

On reaching the core the cotton becomes attached thereto or to the bale in course of formation and is immediately caught and packed by said springs. Thus it will be seen that cotton entering the baling-chamber must come in contact with the bale being formed and given an opportunity to become attached to the bale before it leaves the restraining influence of the springs. After passing beyond said springs should the cotton fly from the bale and pack against either set of springs it will be caught and again forced onto the bale. Such particles of cotton as fall to the bottom of screen 5 can either be removed by some appropriate device and fed back to the feed-chute 1 during the time the bale is being formed or after the bale has been removed from the machine. Should an excess amount of cotton accumulate in the bottom of cylinder 5 and no means of removing it during the process of forming the bale are provided, it will be obvious the fibers will come in contact with and attach themselves to the bale as the bale increases in size.

I am aware that minor changes in the construction, arrangement, and combination of the several parts of my machine can be made and substituted for those herein shown and described without in the least departing from the nature and principle of my invention.

Having thus described my invention, what I claim, and desire to secure by Letters Patent, is—

1. In an apparatus of the class described, the combination with a closed baling-chamber, of bale-forming mechanism therein, cotton-feeding mechanism therefor, and means for exhausting the air from said chamber; substantially as described.

2. In an apparatus of the class described, the combination with a closed baling-chamber, of bale-forming mechanism therein, cotton-feeding mechanism therefor, and means for drawing air through said chamber whereby the incoming air serves to facilitate the feed of cotton to the bale-forming mechanism; substantially as described.

3. In an apparatus of the class described, the combination with a closed chamber, of a screened compartment therein, bale-forming mechanism in said screened compartment, means for feeding cotton thereto, and means for exhausting the air from said compartment, said exhausting means being connected to the chamber outside the screened compartment; substantially as described.

4. In an apparatus of the class described, the combination with a closed chamber composed in part of hinged sections, of bale-forming mechanism therein, means for feeding cotton thereto, and means for exhausting the air from said chamber; substantially as described.

5. In an apparatus of the class described, the combination with a closed chamber composed in part of a hinged section, of a chute in connection therewith, an exhaust-fan connected to the stationary portion of said chamber, a screened cylinder open at one side adjacent to the feed-chute and divided at the opposite side along the line of division of the casing, and a bale-forming mechanism in said screened cylinder; substantially as described.

6. In an apparatus of the class described, the combination with a casing, of a rotatable core, means for rotating said core, and sets of springs coöperating therewith and arranged at different angles with relation to each other; substantially as described.

7. In an apparatus of the character described, the combination with a casing, of a rotatable core mounted therein, means for rotating said core, and springs equidistantly arranged around the core for distributing cotton on said core; substantially as described.

8. In an apparatus of the character described, the combination with a casing having a hinged section, of a rotatable core mounted therein, means for rotating said core, sets of springs whose free ends coöperate with said core, and cotton wound thereon, one of said sets of springs serving to direct the cotton to the core and the other set of said springs being mounted in the hinged section, whereby when said hinged section is folded back said last-mentioned set of springs is moved so as to permit the removal of the finished bale; substantially as described.

9. In a baling apparatus, the combination of a rotatable core and means for operating the core, a casing around the core providing a pneumatic chamber, and means for automatically feeding loose lint-cotton onto the core, including springs having their ends tangentially arranged with relation to the core; substantially as described.

10. In a baling apparatus, the combination with a rotatable core provided with spurs, means for operating said core, and springs equidistantly arranged with relation to the core and having ends adjacent to the spurs whereby the lint-cotton may be fed by the springs to be engaged by the spurs; substantially as described.

11. In a baling apparatus, the combination of a casing providing a pneumatic suction-chamber, a rotatable core within the chamber, means for operating said core, and devices arranged around the core for feeding loose lint-cotton thereto, said devices bearing against opposite portions of the core, the bearing portions of the devices being tangentially arranged with relation to the core so as to arrange the fibers of the cotton substantially in parallelisms; substantially as described.

12. In an apparatus of the class described, the combination with a suction-chamber, of a rotatable core in said chamber, means for operating the core, and yielding devices having free ends arranged on opposite sides of the core for straightening vegetable fibers as they are wound upon the core; substantially as described.

13. In a unitary structure, a combined baling and fiber-straightening machine adapted to form loose lint-cotton into compact bales in which the fibers are subjected to a straightening action while being formed into a bale, said baling and fiber-straightening machine including a rotatable core having means for operating it, a suction-chamber surrounding the core, and springs having free ends to bear against the fibers as they are wound upon the core; substantially as described.

14. In an apparatus of the class described, the combination with a pneumatic chamber, of a rotatable core in said chamber, means for operating the core, and means arranged about the core for straightening vegetable fibers as they are wound upon the core; substantially as described.

15. In a combined baling and fiber-straightening machine, the combination with a rotatable core, means for rotating the core, a casing around the core providing a pneumatic chamber, and means within the casing for arranging lint fibers in parallelism on the core; substantially as described.

In testimony whereof I hereunto affix my signature, in the presence of two witnesses, this 13th day of September, 1902.

WILLIAM ANDREW McGREGOR.

Witnesses:
 JACK WILLIAMS,
 W. B. GIBBONS.